(12) United States Patent
Hesketh

(10) Patent No.: US 6,437,310 B2
(45) Date of Patent: Aug. 20, 2002

(54) THRESHOLD COMPARATOR

(75) Inventor: Carl G. Hesketh, Preston (GB)

(73) Assignee: BAE Systems plc, Farnborough (GB)

( * ) Notice: Subject to any disclaimer, the term of this patent is extended or adjusted under 35 U.S.C. 154(b) by 0 days.

(21) Appl. No.: 09/735,924

(22) Filed: Dec. 14, 2000

Related U.S. Application Data

(63) Continuation of application No. PCT/GB00/03994, filed on Oct. 17, 2000.

(30) Foreign Application Priority Data

Oct. 27, 1999 (GB) .............................................. 9925250

(51) Int. Cl.⁷ ................................................. H01J 40/14
(52) U.S. Cl. ................................ 250/214 C; 250/208.2
(58) Field of Search ......................... 250/208.2, 214 R, 250/214 DC, 551

(56) References Cited

U.S. PATENT DOCUMENTS 4,442,550 A    4/1984   Killat
5,095,459 A  * 3/1992   Ohta et al. ..................... 706/40
6,118,490 A  * 9/2000   Moore et al. ................ 348/473

FOREIGN PATENT DOCUMENTS

EP    0 273 802      7/1988
WO    WO 92/11591    7/1992

OTHER PUBLICATIONS

Patent Abstracts of Japan, vol. 11, No. 324 (P–628) Oct. 1987, "Bus Control Circuit".

* cited by examiner

*Primary Examiner*—Stephone Allen
(74) *Attorney, Agent, or Firm*—Nixon & Vanderhye P.C.

(57) ABSTRACT

A threshold device or comparator comprises an array of energy emitters, e.g. light emitting diodes (16) or diode arrangements. The bits of a binary string are supplied to respective diodes or diode arrangements, which have the property of emitting energy of a distinguishable different characteristic depending on whether the applied bit is a 0 or 1. Sensors (18, 20) sensitive to the intensities of the respective different characteristics detect the intensities and a comparator 24 provides an output indicating the relative quantities of 0's and 1's in the binary string.

11 Claims, 2 Drawing Sheets

THRESHOLD COMPARATOR

This is a continuation of PCT application Ser. No. PCT/GB00/03994, filed Oct. 17, 2000, the entire content of which is hereby incorporated by reference in this application.

BACKGROUND OF THE INVENTION

1. Field of the Invention

This invention relates to apparatus and methods for threshold comparison and in particular, but not exclusively, to such apparatus and methods which use opto-electronic techniques for effecting weightless neural threshold comparison.

2. Discussion of Prior Art

There is a wide range of applications where it is required to effect a threshold comparison of a weightless binary string. A weightless binary string is one in which the bit position of the logic 1's and 0's is immaterial; thus in weightless binary {00101101} has the same weightless value as {10110100} because the number of 1's set in each is the same. Weightless binary numbers are a set of binary digits 1 and 0, each representing just "1" and "0" respectively. There is no least significant bit (LSB) or most significant bit (MSB). The set of bits may be ordered or without order. For example this determination may be used in a binary neuron, or for optical devices implementing the arrangements described in our co-pending published International Application Nos. WO99/33019 and WO99/33175 the entire contents of which are incorporated herein by reference.

This type of comparison may be required in flight control systems, voting systems with redundancy, safety critical systems, telecommunications systems, decision making systems, and artificial intelligence systems, such as neural networks.

In a prior art arrangement, a state machine based system may be used to count the number of 0's and 1's set, and digital arithmetic units used for the comparison. For each binary string, each bit is scanned sequentially and a counter or arithmetic register incremented accordingly. Thereafter the contents of the respective counters or arithmetic registers may be compared to determine the relationship between the number of 0's and 1's set. This type of arrangement may be implemented in software using a microprocessor or a similar state machine.

However this technique is slow and prone to both conductive and emissive radio frequency interference (RFI) as it relies principally on clocks, counters and microprocessors. Both the speed of operation and susceptibility to is disruption or corruption by other noise makes such a system ill-suited for safety critical systems such as flight control systems.

SUMMARY OF THE INVENTION

Accordingly we have provided an arrangement for determining the relationship between the number of 0's and 1's set in a binary string, which does not require a counter or register and does not require a microprocessor or the like for implementation.

Accordingly, in one aspect this invention provides a comparator for receiving a string of binary bits and for comparing the bits to determine the relative quantities of logic 0's and 1's, said comparator including:

a plurality of energy emitting transducer elements each for receiving a respective bit of said string, and each for outputting energy of a first characteristic on receiving a logic "0" and for outputting energy of a second characteristic on receiving a logic "1", and output means for observing the energy emitted from said plurality of transducers and for outputting a respective output signal indicating whether the number of logic 0's is greater than or less than the number of logic 1's.

By this arrangement the relationship between the number of 0's and 1's set is determined by observation of the energy in each of the first and second characteristics.

Preferably, the comparator is operable further to indicate if the number of logic 0's is equal to the number of logic 1's.

The energy may be provided by any suitable transducers, which are capable of emitting distinguishable radiation and which are reasonably free from significant interference from external sources.

Preferably, said energy emitting transducer elements comprise radiation emitting transducer elements emitting radiation of different characteristics. Thus they may emit light in two different wavebands according to the applied input. They may emit light of different polarisations.

However the invention also extends to arrangements which incorporate LED's Laser Diodes, IR LED'S, UV LED's, filament bulbs, CRTs, sound and ultrasonic emitters, microwaves, etc.

Preferably, said transducer elements comprise light emitting diodes. The light emitting diodes may be bi- or tri-color light emitting diodes.

Preferably, the transducer elements are disposed in a regular array.

Preferably, said output means comprises respective first and second sensor means responsive to the radiation in said first and second wavebands to output respective output signals indicative of the relative intensities thereof. For example, the first and second sensor means may include first and second filter means respectively, for selectively passing the respective waveband to be detected.

Preferably said output means further includes means for comparing the output signals from the first and second sensor means to determine whether the number of logic 0's supplied to said transducer elements is greater than or less than the number of logic 1's supplied thereto.

In another aspect, this invention provides a method of comparing the bits in a binary string to determine the relative quantities of logic 0's and logic 1's, which comprises applying said bits to respective transducer elements which output radiation of a first characteristic if a logic 0 is applied and output radiation of a second characteristic if a logic 1 is applied, and monitoring the relative intensities of the respective energies.

In another aspect, this invention provides a comparator for receiving a string of binary bits and for comparing the bits to determine the relative quantities of logic 0's and 1's, said comparator including:

a plurality of energy emitting transducer elements adapted to be responsive to binary bits in said string and the plurality being capable of emitting energy of two different characteristics, wherein the number of logic '0' bits in the string causes a corresponding number of transducer elements to emit energy of one of said characteristics, and the number of logic '1' bits cause a corresponding number of the transducer elements to emit energy of the other of said characteristics.

Whilst the invention has been described above, it extends to any inventive combination of the features set out above or in the following description.

BRIEF DESCRIPTION OF PREFERRED EMBODIMENTS

The invention may be performed in various ways and, by way of example only, an embodiment thereof will now be described, reference being made to the accompanying drawings in which.

Figure 1:
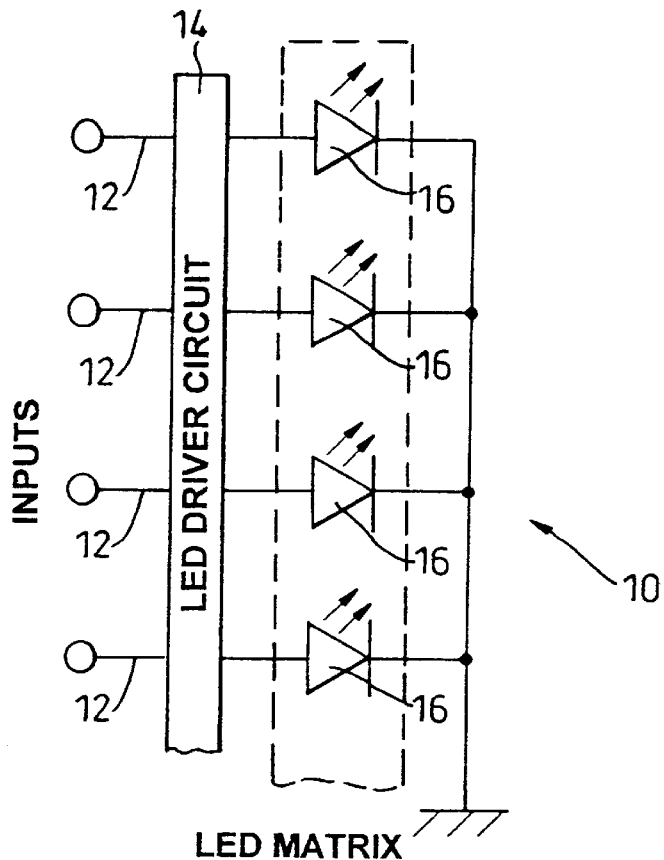
FIG. 1 is a schematic view of the input and L.E.D. matrix arrangement for a comparator in accordance with this invention.

The embodiment to be described below is intended to receive a binary string of length up to the maximum resolution of an array and to output one of three signals indicating respectively whether the number of binary 0's is greater than, less than, or equal to the number of binary 1's in the string.

The binary string is applied to the input of an L.E.D. matrix arrangement 10 with respective bits from the string being applied to respective inputs 12 of the arrangement. The respective inputs 12 are connected to an L.E.D. driver circuit 14 which drives respective bi-color L.E.D.'s 16. The L.E.D.'s 16 are arranged in a regular matrix array and output green light if a logic 0 is applied and red light if a logic 1 is applied.

Figure 2:
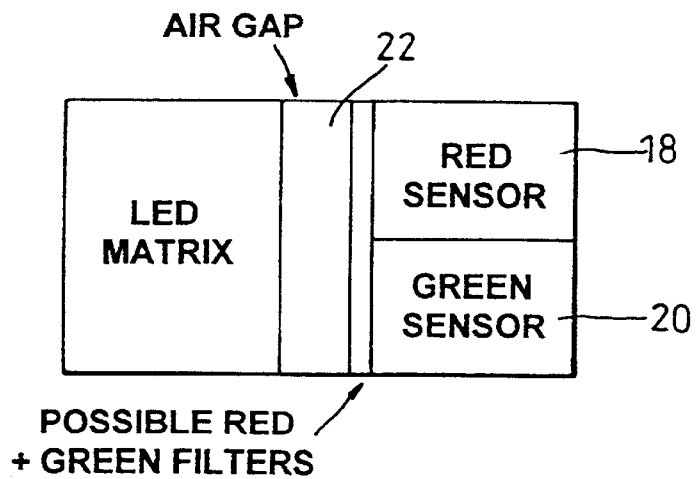
FIG. 2 is a schematic view of the physical arrangement of the L.E.D. matrix and sensor arrangement of an embodiment of comparator in accordance with the invention.

Referring to FIG. 2, the L.E.D. matrix is located in an arrangement in which the matrix of L.E.D.'s 16 faces two optical sensors, a red sensor 18 and a green sensor 20 respectively, across an air gap 22. The red sensor 18 is sensitive only to red light whereas the green sensor 20 is sensitive only to green light. This may be achieved by the use of respective red and green filters. The outputs from the sensors are directly proportional to the intensity of the light shining on them and this in turn is dependent on the number of L.E.D.'s emitting light of that particular color in the matrix.

Figure 3:
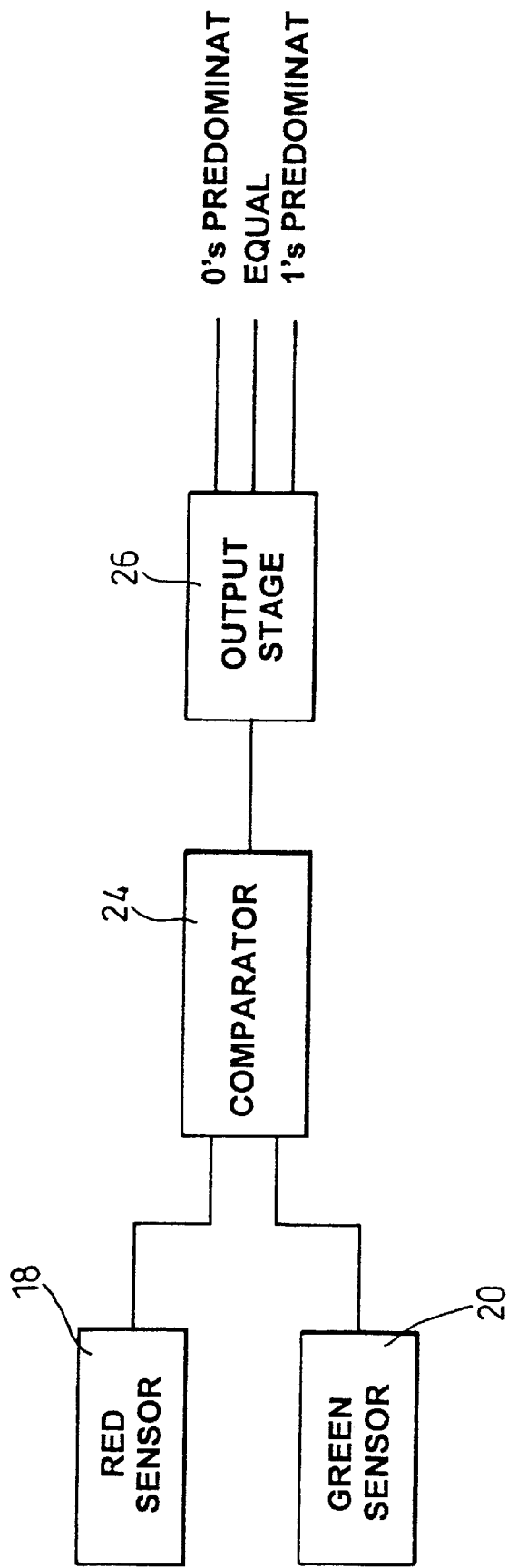
FIG. 3 is a circuit diagram indicating the two output sensors and the associated comparison and output circuitry.

As shown in FIG. 3, the outputs from the red sensor and the green sensor are passed to a comparator 24 which compares the two outputs and causes a final output stage 26 to set one of three outputs high dependent on whether the 0's are predominant, the 1's are predominant, or there is an equal number of 0's and 1's.

The number of emitters in an array may vary according to the particular requirements, but a typical number is 16. The emitter array is preferably considerably larger than the sensor array, with a focusing or other light distribution system provided to ensure that each the radiation from the emitters falls onto the sensors.

The bi-color LED's could be replaced by any other energy emitters or collections thereof which have the property that, or include circuitry or are constructed so that, they emit different energy according to whether the applied logic bit is a '0' or '1'.

It will be appreciated that this system effects a numerical comparison without requiring a counter or the like. Accordingly the system has greater immunity to radio frequency interference and counter-based disruption or corruption.

What is claimed is:

1. A comparator for receiving a string of binary bits and for comparing the bits to determine the relative quantities of logic 0's and 1's, said comparator including:

a plurality of energy emitting transducer elements each for receiving a respective bit of said string, and each for outputting energy having a first detectable characteristic on receiving a logic "0" and for outputting energy having a second detectable characteristic on receiving a logic "1", said second detectable characteristic distinguishable from said first detectable characteristic, sensor means for detecting the energy emitted from said plurality of transducers and for providing respective intensity signals indicative of respective intensities of the energy of said first and second characteristic respectively, and output means responsive to said intensity signals for outputting an output signal indicating whether the number of logic 0's is greater than or less than the number of logic 1's.

2. A comparator according to claim 1, wherein said output means is further operable to indicate if the number of logic 1's is equal to the number of logic 0's.

3. A comparator according to claim 1, wherein said transducer elements are disposed in a regular array.

4. A comparator according to claim 1, wherein said energy emitting transducer elements are radiation emitting transducer elements.

5. A comparator according to claim 4, wherein said radiation emitting transducer elements comprise light emitting diodes.

6. A comparator according to claim 5, wherein said light emitting diodes are bi- or tri- color light emitting diodes.

7. A comparator according to claim 4, wherein said radiation emitting transducer elements emit radiation of a first wavelength in response to a receipt of a logic 0 and emit radiation of a second wavelength in response to receipt of a logic 1, and said output means comprises respective first and second sensor means responsive to the radiation of said first and second wavelengths to output respective output signals indicative of the relative intensity of said radiation.

8. A comparator according to claim 7, wherein said first and second sensor means include first and second filter means for selectively passing respective wavelengths to be detected.

9. A comparator according to claim 7 or claim 8, wherein said output means further includes means for comparing the output signals to determine whether the number of logic 0's supplied to said transducer elements is greater than, less than, or equal to the number of logic 1's.

10. A method of comparing the bits in a binary string to determine the relative number of logic 0's and logic 1's, which comprises applying said bits to respective transducer elements which emit energy of a first characteristic if a logic 0 is applied and emit energy of a second characteristic if a logic 1 is applied, and monitoring the relative intensities of the respective energies.

11. A comparator for receiving a string of binary bits and for determining the relative quantities of logic 0's and 1's, said comparator including:

a plurality of energy emitting transducer elements adapted to be responsive to binary bits in said string and the plurality being capable of emitting energy of two different distinguishable characteristics, wherein the number of logic '0' bits in the string causes a corresponding number of transducer elements to emit energy of one of said distinguishable characteristics, and the number of logic '1' bits cause a corresponding number of the transducer elements to emit energy of the other of said distinguishable characteristics, a detector for detecting the intensity of the energy of said one distinguishable characteristics and the intensity of the energy of said other distinguishable characteristic, and an output device responsive to said detector for outputting a signal indicating whether the number of logic 1's is greater or less than the number of logic 0's.

* * * * *